United States Patent [19]
Kress et al.

[11] Patent Number: 4,792,264
[45] Date of Patent: Dec. 20, 1988

[54] SINGLE BIT REAMER

[75] Inventors: Dieter Kress, Aalen; Friedrich Häberle, Lauchheim, both of Fed. Rep. of Germany

[73] Assignee: Mapal Fabrik für Präzisionswerkzeuge Dr Kress KG, Aalen, Fed. Rep. of Germany

[21] Appl. No.: 82,973

[22] Filed: Aug. 4, 1987

Related U.S. Application Data

[63] Continuation of Ser. No. 773,577, Sep. 23, 1985, abandoned, and a continuation of Ser. No. 456,808, Jan. 10, 1983, abandoned.

[30] Foreign Application Priority Data

Jan. 15, 1982 [DE] Fed. Rep. of Germany ....... 3201137

[51] Int. Cl.⁴ ............................................. B23B 41/00
[52] U.S. Cl. .................................... 408/199; 408/238
[58] Field of Search ............... 408/227, 199, 188, 224, 408/200, 82, 83, 59, 187, 190, 229, 713

[56] References Cited

U.S. PATENT DOCUMENTS 4,133,399  1/1979  Herrmann ........................... 408/713

FOREIGN PATENT DOCUMENTS

| 2903814 | 8/1980 | Fed. Rep. of Germany ...... 408/190 |
| 3201137 | 5/1983 | Fed. Rep. of Germany . |
| 1363457 | 5/1964 | France ............................... 408/188 |
| 0157911 | 12/1981 | Japan ................................ 408/199 |
| 1029476 | 5/1966 | United Kingdom . |

OTHER PUBLICATIONS

"Machinery and Production Engineering" Sep. 19, 1979, vol. 135, No. 3479, pp. 60–62.
"Machinery and Production Engineering" Sep. 19, 1979, vol. 135, No. 3479, pp. 59–61.
German article (Tiefbohrwerkzeuge für die Metallbearbeitung), pp. 42 and 44 by Thomas Friese (May 11, 1979).

*Primary Examiner*—Gil Weidenfeld
*Assistant Examiner*—Thomas M. Kline
*Attorney, Agent, or Firm*—Erwin S. Teltscher

[57] ABSTRACT

The cutter head of a reamer carries a circular tool bit and two guide members. Each guide member has an outer-most edge at the furthest distance from the center of rotation of the tool and slanted edges inclined at progressively greater angles from the outer edge towards the front of the tool where the initial cut takes place. The first slanted edge, at an angle of less than 10 degrees and preferably between 3 and 5 degrees, intersects the outer-most edge at a point which lags the extreme point on the tool bit by about 0.4 mm in the direction of advance of the tool. The first slanted edge extends at least to the radial plane containing the extreme point of the tool bit. Thereafter, a slanted edge at an angle inclined between 15 and 25 degrees extends in the forward direction, to be followed by a third slanted edge inclined at an angle to the outer-most edge of between 30 and 75 degrees. The exact angles of inclination are determined by the diameter of the circular tool bit, which, in turn, is determined by the material to be cut.

6 Claims, 1 Drawing Sheet

SINGLE BIT REAMER

This is a continuation of application Ser. No. 773,577, filed Sept. 23, 1985, now abandoned, and a continuation of application Ser. No. 456,808, filed Jan. 10, 1983, now abandoned.

CROSS REFERENCE TO RELATED APPLICATIONS AND PUBLICATIONS

1. U.S. Pat. No. 3,490,315;
2. U.S. Pat. No. 4,293,252;
3. U.S. Pat. No. 4,211,507;
4. U.S. Pat. No. 4,199,284;
5. German Patent No. 16 27 221.

FIELD OF THE INVENTION

The present invention relates to rotary cutting tools, and, more specifically, to self-centering single bit precision reamers.

BACKGROUND OF THE INVENTION

Present day reamers must be self-centering when the cut is initiated, in spite of the relatively large conatilever length inherent in their use. For reamers utilizing a plurality of bits, all having cutting points lying in the same plane when viewed in the axial direction, so that all bits commence to cut simultaneously, the centering requirement is automatically fulfilled.

In single bit reamers having a rectangular turnplate, the cut-initiating angles of the bit correspond to the initiating angles of the guide members even for two leading angles.

A single bit reamer with a bit having a circular cutting edge is disclosed in German Patent No. 16 27 221. The reamer has two guide members arranged symmetrically to the central axis of the cutter head. In this reamer, the bit and the guide members are arranged on a carrier which is movable within the body of the tool in a direction perpendicular to its axis. The bit and the two guide members provide three points of contact between the cutter head and the workpiece, automatically adjusting the position of the tool to be concentric to its axis of rotation. The resulting bore is therefore concentric to the axis of rotation. However, neither a precise diameter nor an exact concentricity (deviation less than approximately 5 microns) can be achieved with this type of reamer.

SUMMARY OF THE INVENTION

It is an object of the present invention to furnish a single bit reamer with guide members which allow automatic centering at the start of the cutting operation and achieve an exact concentricity of the resulting bore.

A further object of the present invention is to furnish a reamer with reduced chatter at the start of the cutting operation.

In accordance with the present invention, a reamer has a cutter head which rotates about a central axis. It has a bit with a circular cutting edge fastened to the cutter head, the bit having an extreme point furthest removed from the central axis in a radial direction. At least one guide member is positioned at a predetermined distance from the bit along the periphery of the cutter head. The guide member has an outer-most point which is at the same radial distance from the central axis as is the extreme point of the bit. This outermost point lags the extreme point of the bit by a predetermined distance in the direction of advance of the reamer.

In a preferred embodiment, two guide members are provided, one placed diametrically opposite the bit, the other at an angle of approximately 40 degrees behind the bit in the direction of rotation of the head.

Each of the guide members has an outer-most edge parallel to the central axis. The outer-most or frontmost point of each guide member is herein defined as the point at which these edges adjoin a slanted edge inclined at an angle of less than 10 degrees to the outer-most edge. This first slanted edge adjoins a second slanted edge inclined at a greater angle than the first, for example an angle between 15 and 25 degrees. Finally, a third slanted edge inclined at a third angle, between 30 and 75 degrees, preceding the second inclined edge in the direction of advance of the tool, is provided.

The guide members are so dimensioned that if the reamer cuts to a depth of, for example, 0.25 mm, the bit, which leads the guide members, engages the workpiece first. Due to the cutting force, the reamer is temporarily displaced from its central position in one radial direction. As the slanted edges of the guide members come in contact with the inner edge of the workpiece, the bit is displaced in another radial direction until each time as the cutter head is perfectly centerd, namely when the outer-most point of each guide member and the extreme point of the bit are all engaged with the workpiece.

The novel features which are considered as characteristic of the invention are set forth in particular in the appended claims. This invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENT

Figure 1:
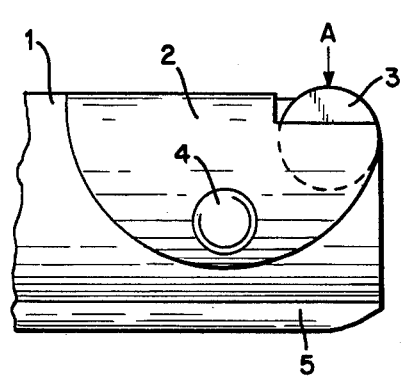
FIG. 1 is a side view of the cutter head.
Figure 3:
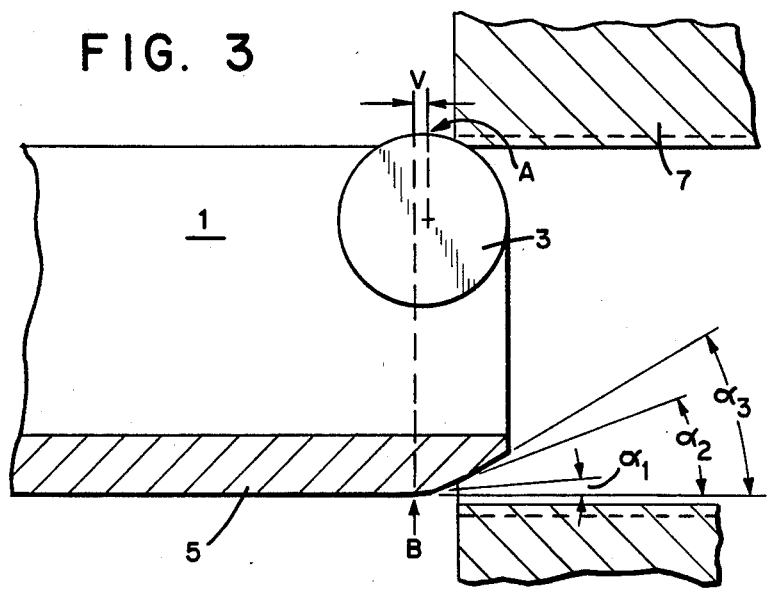
FIG. 3 is an axial cross-section through a bore with the cutter head in the starting phase.

In FIG. 1, cutter head 1 has a shoulder against which a clamping shoe 2 clamps a circular disc-shaped bit 3. The clamping is effected by means of a threaded bolt 4. Two guide members 5 and 6 are embedded along the periphery of the cutter head. As illustrated in FIG. 3, guide member 5 has an outer-most edge which is parallel to the central axis of the cutter head. As can be seen from FIGS. 1 and 3, the bit 3 with the circular cutting edge defines an axuiliary axis extending perpendicularly to the central axis of rotation of the cutter head 1. The intersection of this edge with a first slanted edge, inclined at a first angle thereto, defines a point B, herein referred to as the outer-most point of the guide member. Also shown in FIG. 3 is a point A, which defines the point on the bit which is furthest distant from the center of the reamer. This point projects past the outer edge of the cutter head and precedes point B in the direction of advance of the cutting tool.

Again referring to FIG. 3, the first slanted edge of guide member 5, namely the slanted edge adjacent to point B, is straight and inclined at an angle $\alpha 1$ and extends at least to the radial plane including point A. This angle is less than 10 degrees and is preferably between 3 and 5 degrees. The two additional slanted edges are also straight and inclined at an angle α2 between 15 and 25 degrees and an angle α3 between 30 and 75 degrees, respectively. The actual size of these angles for a given application depends upon the diameter of bit 3, which, in turn, depends upon the material to be cut. An advance of 0.4 mm between points A and B in FIG. 3 has been found effective for bit diameters of between 5 and 8 mm.

Figure 2:
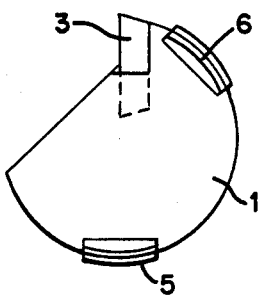
FIG. 2 is a front view of the cutter head.

A preferred placement for the two guide members 5 and 6 is shown in FIG. 2. It will be noted that guide member 5 is diametrically opposite bit 3, while guide member 6 lags bit 3 in the direction of cutter rotation by approximately 40 degrees.

While the invention has been illustrated in a preferred embodiment, it is not to be limited to the specific members and structures shown, since many variations thereof will be evident to one skilled in the art and are intended to be encompassed in the present invention as set forth in the following claims.

We claim:

1. In a single bit reamer adapted to be advanced in a predetermined direction of advance relative to a workpiece, while exerting a cutting force thereon, but free of being supported by any bore sleeve or floating holder, said single bit reamer having a cutter head rotating about a central axis, said cutter head having a cutter head periphery, the improvement comprising:

a bit of a predetermined diameter between 5 and 8 mm with a circular cutting edge, and being fastened to said cutter head, said bit having an extreme point furthest removed from said central axis in a radial direction, and first and second guide members positioned on said cutter head at first and second respective prearranged distances about said periphery, each of said guide members having an outermost edge parallel to said central axis of said cutter head, each of said outermost edges having a frontmost point, as viewed in said predetermined direction, each of said outermost points of said guide members lagging said extreme point of said cutting bit by a preselected distance of about 0.4 mm in said direction of advance of said reamer, each of said guide members further having a first slanted edge extending from the respective one of said outermost points towards said workpiece, inclined at a first angle less than 10° to said respective one of said outermost edges, each of said guide members further having a second slanted edge immediately preceding said first slanted edge in the direction of advance of said cutting tool, said second edge being inclined at a second angle inclined between 15° and 25° to the respective one of said outermost edges, whereby said single bit engages the workpiece first, and is thereafter temporarily displaced, together with said cutter head, from a central position thereof in one radial direction during operative advancement of said cutter head in said workpiece, but when it comes into contact with one of the slanted edges of one of said guide members, said single bit is displaced in another radial direction, until the frontmost point of each guide member, and the extreme point of said bit furthest removed from the central axis are all engaged with the workpiece, and the cutter head is thereby centered.

2. A reamer as set forth in claim 1, wherein each of said guide members further has a third slanted edge preceding said second slanted edge in said predetermined direction of advance of said cutting tool, each of said third slanted edges being inclined at a third angle to the respective one of said outermost edges between 30° and 75°.

3. A reamer as set forth in claim 1, wherein said first guide member is positioned directly opposite said bit.

4. A reamer as set forth in claim 1, wherein said first angle is between 3° and 5°.

5. A reamer as set forth in claim 1, wherein said cutter head has a predetermined direction of rotation, and wherein said second guide member is angularly positioned approximately 40 degrees behind said bit as considered in said direction of rotation.

6. A reamer as set forth in claim 1, wherein each slanted edge is a straight slanted edge.

* * * * *